(12) United States Patent
Pettersson

(10) Patent No.: US 10,968,042 B2
(45) Date of Patent: Apr. 6, 2021

(54) BELT CONVEYOR AND SYSTEM

(71) Applicant: PACKSIZE LLC, Salt Lake City, UT (US)

(72) Inventor: Niklas Pettersson, Västerås (SE)

(73) Assignee: Packsize LLC, Salt Lake City, UT (US)

(*) Notice: Subject to any disclaimer, the term of this patent is extended or adjusted under 35 U.S.C. 154(b) by 0 days.

(21) Appl. No.: 16/479,301

(22) PCT Filed: Jan. 5, 2018

(86) PCT No.: PCT/US2018/012547
§ 371 (c)(1),
(2) Date: Jul. 19, 2019

(87) PCT Pub. No.: WO2018/136244
PCT Pub. Date: Jul. 26, 2018

(65) Prior Publication Data
US 2019/0382205 A1 Dec. 19, 2019

(30) Foreign Application Priority Data
Jan. 20, 2017 (SE) .................................... 1750051-3

(51) Int. Cl.
B65G 15/46 (2006.01)
B65G 15/62 (2006.01)

(52) U.S. Cl.
CPC ............ B65G 15/46 (2013.01); B65G 15/62 (2013.01)

(58) Field of Classification Search
CPC .............................. B65G 15/46; B65G 15/62
(Continued)

(56) References Cited

U.S. PATENT DOCUMENTS 3,327,839 A * 6/1967 Arnold ................. B01D 33/056
198/835
4,792,324 A * 12/1988 Whitaker .................. F16G 5/16
474/237

(Continued)

FOREIGN PATENT DOCUMENTS

CN 203306580 U 11/2013
CN 104787579 A 7/2015
(Continued)

OTHER PUBLICATIONS

International Search Report and Written Opinion for PCT/US2018/012547 dated Apr. 5, 2018.

Primary Examiner — Douglas A Hess
(74) Attorney, Agent, or Firm — Workman Nydegger

(57) ABSTRACT

A belt conveyor (1), a belt conveyor system and a box template production system. Said belt conveyor comprising an endless loop of belt (3) which is rotating about at least two pulleys (5a, 5b) comprised in the belt conveyor, whereby different parts of the belt (3) will constitute an upper surface (7) for transporting goods during run, the belt conveyer (1) further comprising a frame (9) holding said at least two pulleys (5a, 5b) and a belt supporting device (11) configured for supporting the belt between the at least two pulleys while allowing the belt (3) to slide over the belt supporting device (11), wherein said belt (3) comprises a substantially plane middle part (13) along the length of the belt and two edge areas (13a, 13b), one provided on each side of the middle part (13), wherein at least one of said edge areas (13a, 13b) is sloped towards an opposite part of the belt in the endless loop at least when said at least one edge area (13a, 13b) constitutes a part of the upper surface of the belt.

18 Claims, 8 Drawing Sheets

(58) Field of Classification Search
USPC ............ 198/818, 819, 823, 826, 831, 844.1
See application file for complete search history.

(56) References Cited

U.S. PATENT DOCUMENTS

| | | | | |
|---|---|---|---|---|
| 4,863,419 | A * | 9/1989 | Sansone ................ | B65G 15/42 474/237 |
| 5,007,528 | A * | 4/1991 | Hideharu ............... | B65G 15/60 198/823 |
| 5,316,132 | A | 5/1994 | Muraoka et al. | |
| 5,394,977 | A * | 3/1995 | Cline .................... | B65G 15/02 198/831 |
| 5,692,597 | A * | 12/1997 | Ferguson .............. | B65G 15/00 198/841 |
| 6,220,426 | B1 * | 4/2001 | Giana ................... | B65G 15/42 198/818 |
| 7,232,030 | B2 * | 6/2007 | Duncan ................. | B65G 15/02 198/831 |
| 7,497,325 | B2 * | 3/2009 | Simoens ................ | B65G 21/08 198/836.1 |
| 7,604,112 | B1 * | 10/2009 | Lee ....................... | B65G 15/56 198/831 |
| 7,950,520 | B2 * | 5/2011 | Mott ..................... | B65G 39/12 198/826 |
| 8,328,006 | B2 * | 12/2012 | Mott ..................... | B65G 21/06 198/861.1 |
| 9,464,699 | B2 * | 10/2016 | Kato ..................... | F16C 33/586 |
| 9,527,671 | B2 * | 12/2016 | Marshall ............... | B65G 17/06 |
| 9,670,003 | B2 * | 6/2017 | Ferguson .............. | B65G 39/12 |
| 9,856,087 | B2 * | 1/2018 | Beesley ................ | B65G 17/44 |
| 10,315,847 | B2 * | 6/2019 | Malkowski .......... | B65G 17/067 |
| 2004/0104100 | A1 | 6/2004 | Schiesser et al. | |
| 2007/0029171 | A1 | 2/2007 | Nemedi | |

FOREIGN PATENT DOCUMENTS

| | | |
|---|---|---|
| DE | 1756812 | 9/1970 |
| DE | 2928403 | 1/1980 |
| DE | 3141510 A1 | 5/1983 |
| EP | 0613843 A1 | 9/1994 |
| EP | 1815957 | 8/2007 |
| JP | S61162411 | 7/1986 |
| JP | H04129943 | 4/1992 |
| JP | 2009256047 | 11/2009 |
| JP | 2015044682 | 3/2015 |
| WO | 2018136244 | 7/2018 |

* cited by examiner

BELT CONVEYOR AND SYSTEM

CROSS-REFERENCE TO RELATED APPLICATIONS

This application claims priority to PCT Application No. PCT/US2018/012547, filed Jan. 5, 2018, entitled "A BELT CONVEYOR AND SYSTEM", which claims the benefit of and priority to Swedish Application No. 1750051-3, filed Jan. 20, 2017. All the aforementioned applications are incorporated by reference herein in their entirety.

TECHNICAL FIELD OF THE INVENTION

The present invention relates to a belt conveyor, a belt conveyor system and a box template production system.

RELATED ART

Belt conveyors are commonly used for the transportation of goods. Different sizes of belt conveyors are available. However large belt conveyors are both expensive and difficult to handle.

SUMMARY

An object of the present invention is to provide an improved and more flexible belt conveyor.

This is achieved by a belt conveyor and a belt conveyor system according to the independent claims.

In one aspect of the invention a belt conveyor is provided comprising an endless loop of belt which is rotating about at least two pulleys comprised in the belt conveyor, whereby different parts of the belt will constitute an upper surface for transporting goods during run, the belt conveyer further comprising a frame holding said at least two pulleys and a belt supporting device configured for supporting the belt between the at least two pulleys while allowing the belt to slide over the belt supporting device, wherein said belt comprises a substantially plane middle part along the length of the belt and two edge areas, one provided on each side of the middle part, wherein at least one of said edge areas is sloped towards an opposite part of the belt in the endless loop at least when said at least one edge area constitutes a part of the upper surface of the belt.

In another aspect of the invention a belt conveyor system is provided comprising at least two belt conveyors according to the invention, wherein said at least two belt conveyors are positioned side by side with sloped edge areas of the belt towards each other together providing a combined upper surface of the belt conveyor system.

Hereby two or more belt conveyors according to the invention can be provided side by side providing a combined large upper surface instead of using a single large belt conveyor. Smaller belt conveyors are both much cheaper and easier to handle. Furthermore, since at least one edge area of the belt of each belt conveyor is sloped these sloped edge areas are provided towards each other in a belt conveyor system. Hereby problems which may arise when goods are passing between two belt conveyors provided side by side can be avoided. In some applications, such as in a box template production machine, the goods to be transported on the conveyor belt will first be provided out from a machine onto the conveyor belt from a transverse direction to the belt conveyor transportation direction. Problems could then arise when goods get stuck between belt conveyors, for example goods can get stuck under the belt or on the belt edges. This could especially be a problem when goods are pushed back and forth transversely over the belt conveyors as could be the case in a box template production machine. Cuttings are made to the box template when they are delivered out to the belt conveyor and the belt conveyor is used as a support for the box template during the cutting procedure before the belt conveyor is turned on for transporting the box template. With the sloped edge areas of the belt conveyors according to this invention the box templates can be transported back and forth in a transverse direction over the belt conveyor system comprising two or more belt conveyors according to the invention without the risk that parts of the box template will get stuck under the belt between two belt conveyors, or on the belt edges. Other means to avoid the latter, often means that a thin guide plate is added above the edges. However, then a non-driven section of the conveyor is introduced, which can cause the goods to fail in following transport, such as rotating or slip. The presented solution provides a way to establish a large completely driven top surface without any elements causing goods to get stuck, still enabling manufacturing and handling of smaller conveyor sections. This in turn enables more standardized conveyor solutions and components to be used, which ensure higher effectiveness in quality and cost. Not only a narrow belt is much more effective to manufacture compared to a very wide one, the pulleys and motor can be drastically downsized, as can the other components such as frame and support plates. Multiple smaller motors not only enable more efficient design and power consumption, it also provides a safer solution. A wide belt creates more than proportionally much friction losses. This causes the need of more powerful motors and more wear. A negative side-effect of using a wide belt is furthermore that the solution does not easily react to abnormal changes in the load. In case a human being step up onto the conveyor, a smaller conveyor run by a smaller motor would not be able to start movement, while a larger might, and thereby causing injury.

The solution is especially advantageous in the earlier mentioned example of transporting packaging material, but certainly conveying other types of goods could also benefit, especially when the goods are fed or pushed in from the side of the conveyor.

Hereby in one aspect of the invention a box template production system is provided comprising a belt conveyor system according to the invention, wherein said belt conveyor system is provided at an outlet from the box template production system for transport of the box templates on the belt conveyor system in a direction transverse to a direction in which the box templates are delivered out from the box template production system.

In one embodiment of the invention at least one of said edge areas of the belt forms a rounded edge of the belt along a long side of the belt conveyor, at least when the at least one edge area constitutes a part of the upper surface of the belt.

In one embodiment of the invention said edge areas of the belt each comprises a belt positioning device extending inwards towards an opposite side of the belt in the endless loop and configured for being provided right outside the width of the belt supporting device or in a guiding element of the belt supporting device for keeping the belt in position.

In one embodiment of the invention the belt conveyor further comprises at least one holding device provided partly along at least one long side of the belt conveyor, wherein said at least one holding device is connected to the frame and configured for holding the belt supporting device.

In one embodiment of the invention said holding device further is configured for supporting said at least one edge area outside said belt supporting device at a different level than the belt supporting device hereby providing at least one sloped edge of the belt.

In one embodiment of the invention said at least one holding device comprises a first part connected to the belt supporting device and configured for supporting said at least one edge area outside said belt supporting device when it constitutes a part of the upper surface of the belt and a second part connected to the first part and connected to the frame, said second part being configured for supporting the at least one edge area when it is not part of the upper surface of the belt.

In one embodiment of the invention said first part comprises a guiding element for directional control of a belt positioning device of the belt.

In another embodiment of the invention the belt supporting device comprises at least one guiding element for directional control of at least one belt positioning device of the belt and wherein said belt supporting device comprises at least one outer edge part comprising said guiding element and providing a support for a corresponding outer edge of the belt at a different level than the rest of the belt supporting device hereby providing at least one sloped edge of the belt.

In one embodiment of the invention no parts of the belt conveyor protrudes in a width direction of the conveyor belt outside a holding device provided partly along at least one long side of the belt conveyor, wherein said at least one holding device is connected to the frame and configured for holding the belt supporting device. Hereby two or more belt conveyors can be positioned close to each other side by side.

DETAILED DESCRIPTION OF THE EMBODIMENTS

Figure 1:
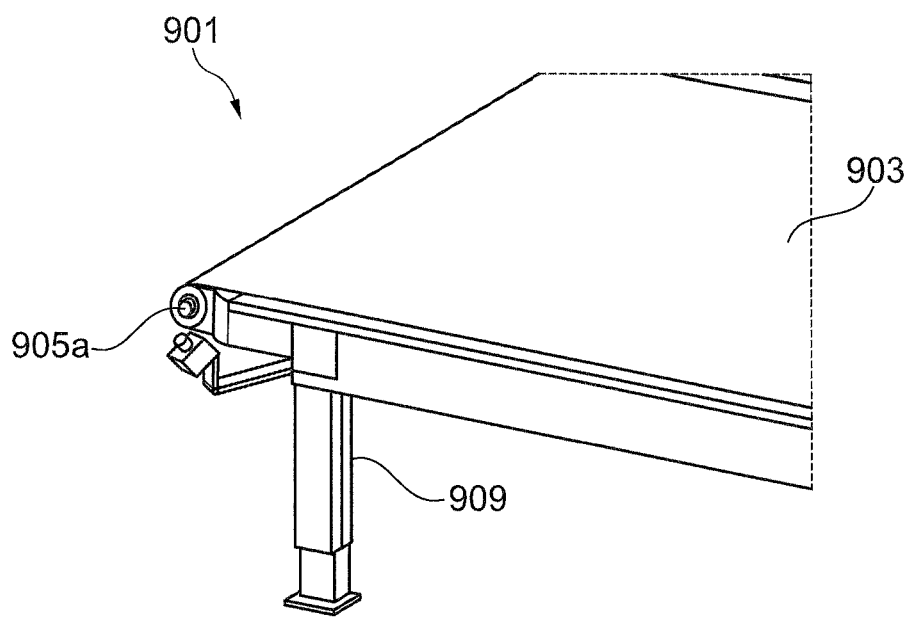
FIG. 1 shows schematically a perspective view of a part of a conventional belt conveyor.

FIG. 1 shows schematically a perspective view of a part of a conventional belt conveyor 901. The belt conveyor 901 comprises an endless loop of belt 903 which is rotating about two pulleys 905a (905b not shown). The belt conveyor 901 comprises further a frame 909 holding said two pulleys 905a and a belt supporting device configured for supporting the belt between the two pulleys while allowing the belt to slide over the belt supporting device.

When positioning two of these conventional belt conveyors side by side for the purpose of achieving a larger combined belt conveyor problems may arise as described above. For example parts of the frame 909 and the pulleys 905a in conventional belt conveyors are often protruding out on the sides of the belt conveyor. Hereby there will be a gap between the separate belts when providing two or more conventional belt conveyors side by side. Furthermore, in applications where goods are transported transverse to the belt direction when delivered to the belt there is a risk that goods get stuck on the belt edges, in the gap between the belt conveyors or even under the belt in the belt conveyors. As described above this may be even more problematic in applications where goods are transported back and forth transverse over the belt conveyors, such as in a box template production system which will be described below.

Figure 2:
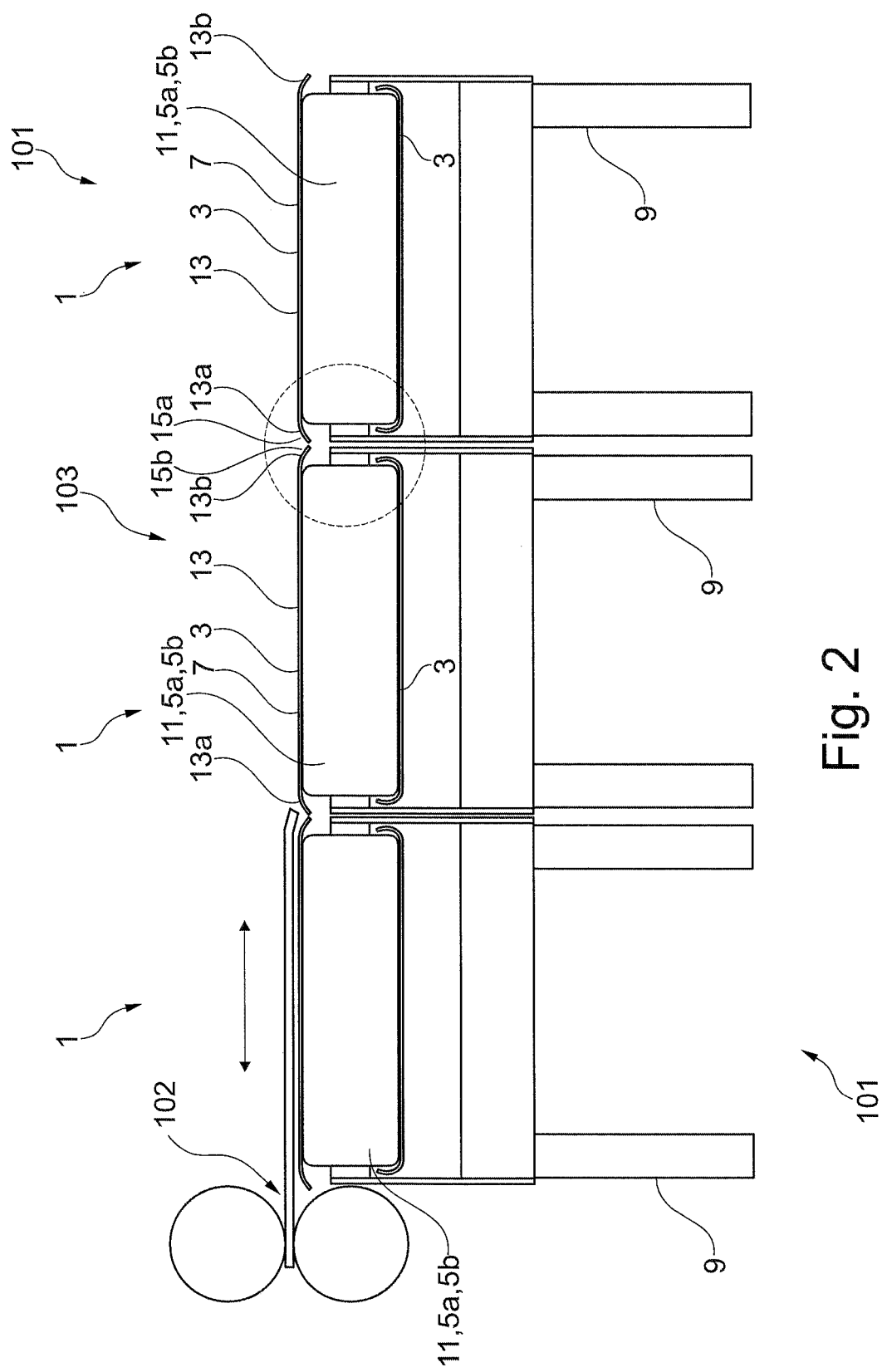
FIG. 2 shows schematically a side view cross section of three belt conveyors according to one embodiment of the invention. The three belt conveyors are positioned side by side to provide a belt conveyor system according to one embodiment of the invention and the belt conveyor system is shown to be provided close to an outlet from a goods providing system delivering goods to the belt conveyor system.

FIG. 2 shows schematically a side view cross section of three belt conveyors 1 according to one embodiment of the invention. The three belt conveyors 1 are positioned side by side to provide a belt conveyor system 101 according to one embodiment of the invention and the belt conveyor system 101 is shown to be provided close to an outlet 102 from a goods providing system delivering goods to the belt conveyor system 101.

Each belt conveyor 1 comprises an endless loop of belt 3 which is rotating about two pulleys 5a, 5b (shown without details as a block in this view) comprised in the belt conveyor 1. Different parts of the belt 3 will constitute an upper surface 7 for transporting goods during run. The belt conveyer 1 further comprises a frame 9 holding said two pulleys 5a, 5b and a belt supporting device 11 (shown without details as a block together with the pulleys 5a, 5b in this view) configured for supporting the belt between the two pulleys while allowing the belt 3 to slide over the belt supporting device 11. The belt 3 comprises a substantially plane middle part 13 along the length of the belt and two edge areas 13a, 13b, one provided on each side of the middle part 13. According to the invention at least one of said edge areas 13a, 13b is sloped towards an opposite part of the belt in the endless loop at least when said at least one edge area 13a, 13b constitutes a part of the upper surface 7 of the belt. In the embodiment shown in FIG. 2 both two edge areas 13a, 13b are sloped towards an opposite part of the belt in the endless loop. In other words at least one of the outer free edges of the belt 3 is provided at a lower level, closer to a surface on which the belt conveyor is provided, than a middle part 13 of the belt 3. The wording sloped edge areas are mostly used throughout the description and the claims and this is meant to cover also angled, chamfered or rounded edge areas. The edge areas 13a, 13b of the belt 3 can be supported by a part of the belt conveyor to a wanted shape, for example chamfered or rounded. In one embodiment of the invention at least one of said edge areas 13a, 13b of the belt 3 forms a rounded edge 15a, 15b of the belt 3 along a long side 17a, 17b of the belt conveyor, at least when the at least one edge area 13a, 13b constitutes a part of the upper surface 7 of the belt.

The belts 3 of the three belt conveyors 1 together provide a combined upper surface 103 of the belt conveyor system.

Figure 3:
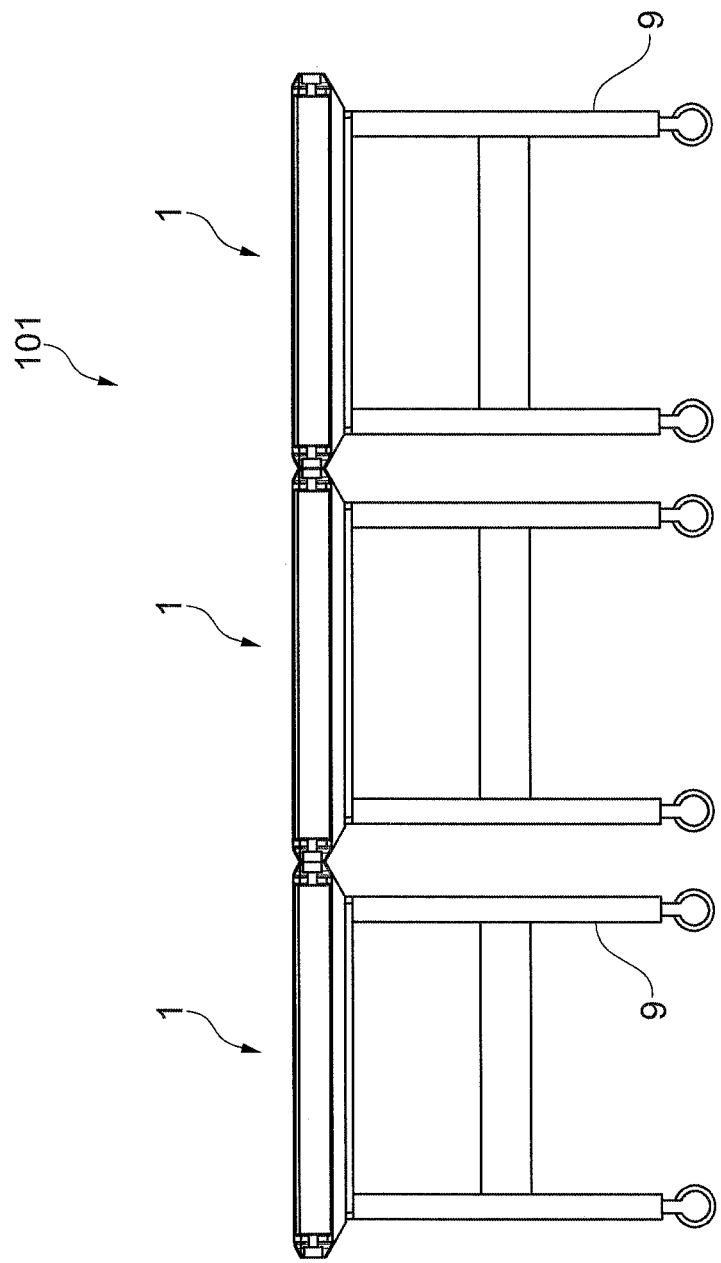
FIG. 3 shows schematically a side view cross section of three belt conveyors according to one embodiment of the invention. The three belt conveyors are positioned side by side to provide a belt conveyor system according to one embodiment of the invention.
Figure 4:
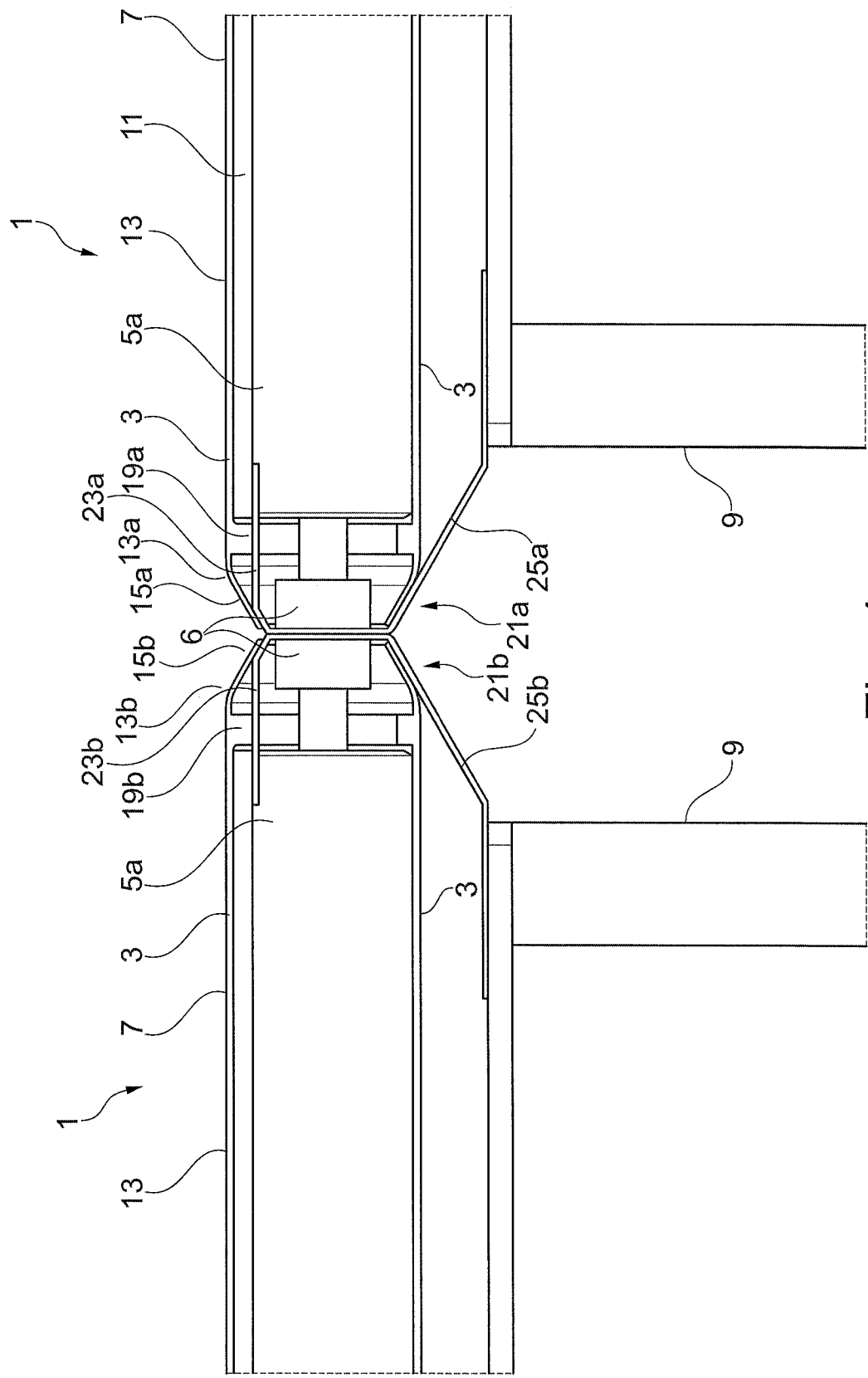
FIG. 4 shows in greater detail a part of the belt conveyors as shown in FIG. 3.

FIG. 3 shows schematically a side view cross section of three belt conveyors 1 according to one embodiment of the invention. The three belt conveyors 1 are positioned side by side to provide a belt conveyor system 101 according to one embodiment of the invention. FIG. 4 shows in greater detail a part of the belt conveyors 1 as shown in FIG. 3. Many of the parts are given the same numbers as in FIG. 4 however they are not necessarily exactly the same. FIGS. 3 and 4 shows more details of a specific embodiment of the invention while FIG. 2 is more general.

In FIG. 4 the pulley 5a at one end of the belt conveyor 1 is seen as well as the supporting device 11 which is for example a plate or rollers provided at substantially the whole distance between the two pulleys 5a, 5b for supporting the belt 3. The supporting device 11 serves the purpose to ensure the belt keeps a rather planar top surface for the goods to ride on. In order to limit noise, glide friction losses and wear, the plate is normally made of a low-friction surface of wood, metal or plastic as way of example. When even lower friction is wanted, a set of rollers can be used instead.

The belt conveyor 1 comprises further at least one holding device 21a, 21b provided partly along at least one long side 17a, 17b (seen in FIG. 7) of the belt conveyor 1. Said at least one holding device 21a, 21b is connected to the frame 9 and configured for holding the belt supporting device 11. In the embodiment of the invention shown in FIGS. 3 and 4 two holding devices 21a, 21b are provided, one to each side of the belt conveyor 1. The holding devices 21a, 21b can be provided as a bent sheet metal plate or an extruded aluminum beam as way of examples. They can be provided one at each side of the belt conveyor along the length of the belt conveyor. The holding device 21a, 21b is in this embodiment configured for supporting said at least one edge area 13a, 13b outside said belt supporting device 11 at a different level than the belt supporting device 11 hereby providing a sloped edge of the belt 3. The holding device 21a, 21b comprises a first part 23a, 23b which is connected to the belt supporting device 11 and configured for holding the belt supporting device 11. The first part 23a, 23b of the holding device is in this embodiment also configured for supporting the edge area 13a, 13b of the belt outside said belt supporting device 11 when it constitutes a part of the upper surface 7 of the belt. In another embodiment the belt supporting device 11 itself could instead be designed for supporting the edge areas 13a, 13b. One such an embodiment is shown in FIG. 8 and will be further described below. In the embodiment shown in FIGS. 3 and 4 the first part 23a, 23b of the holding device 21a, 21b is provided at a lower level than the belt supporting device 11 and will hereby support the edge area 13a, 13b of the belt 3 at a lower level than the level which the middle part 13 of the belt 3 is supported on by the belt supporting device 11. Lower level here refers to directions in the drawings and being closer to a surface onto which the belt conveyor 1 is standing. Hereby the edge areas 13a, 13b will be sloped. The holding device 21a, 21b further comprises a second part 25a, 25b which is connected to the frame 9 and to the first part 23a, 23b. The second part 25a, 25 is in this embodiment also configured for supporting the edge area 13, 13b when it is not part of the upper surface 7 of the belt 3. In this embodiment of the invention the second part 25a, 25 holds up the edge areas 13a, 13b when they are part of the belt 3 not forming parts of the upper surface 7 of the belt 3, i.e. when they are provided on the lower side of the belt in the endless loop, where lower refers to the directions in the drawings.

In this embodiment the edge areas 13a, 13b of the belt 3 each comprises a belt positioning device 19a, 19b extending inwards towards an opposite side of the belt in the endless loop. These belt positioning devices 19a, 19b can be extensions of the belt thickness and can be provided along the whole length of the belt. The material can be the same as the belt material or another. The belt positioning devices can be glued to an inside (referring to the endless loop) of the belt or provided or attached by other means. In this embodiment the belt positioning devices 19a, 19b are configured for being provided right outside the width of the belt supporting device 11 in order to keep the belt in position on the belt supporting device 11 during run of the belt. Other methods for guiding the belt 3 correctly are possible instead of using two belt positioning devices 19a, 19b provided outside the belt supporting device as shown here. Another possibility would be to provide one or more guiding elements, for example in the form of recesses in the belt support device for housing one or more belt positioning devices. Still another alternative for guiding the belt is to design the pulleys with an extended diameter in the middle. This will limit the risk for wrong guiding of the belt. With this guiding method no belt positioning devices 19a, 19b are needed.

Figure 5:
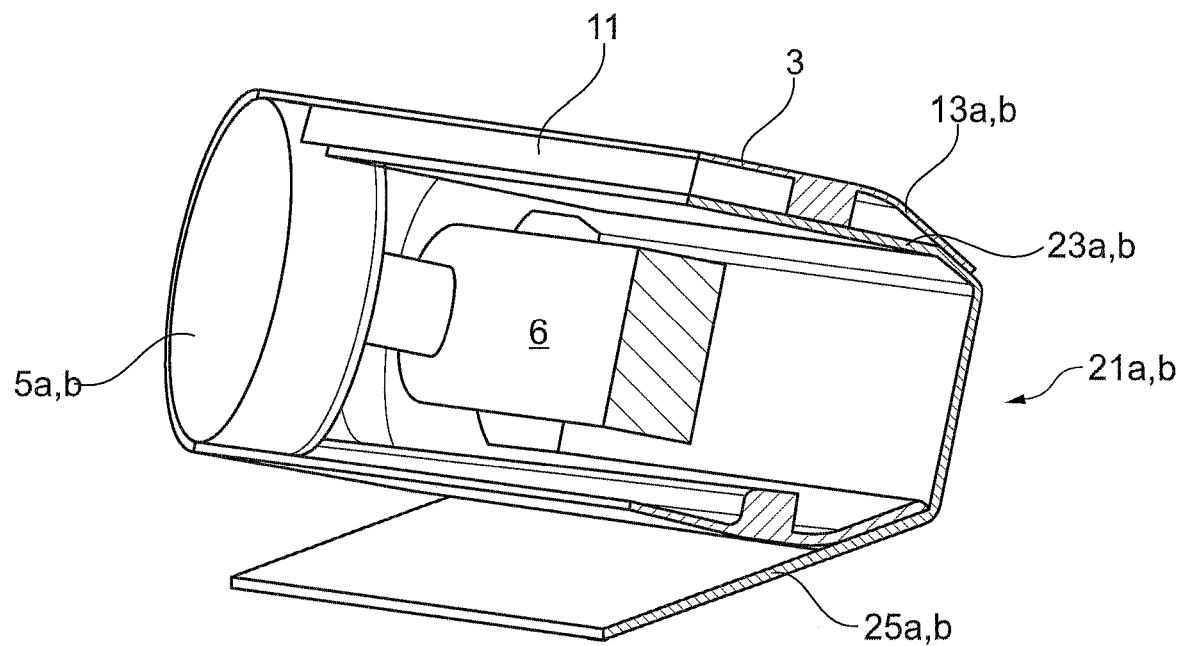
FIG. 5 is a cut segment in perspective of a part of one of the belt conveyors shown in FIGS. 3 and 4.

FIG. 5 is a cut segment in perspective of a part of one of the belt conveyors 1 shown in FIGS. 3 and 4. In this view a part of a holding device 21a, 21b can be seen and a part of a pulley 5a, 5b, a part of the belt supporting device 11 and a part of the belt 3. Furthermore a block 6 can be seen, to which the pulley 5a, 5b is connected. The block 6 is also attached to the holding device 21a, 21b but can be moved in relation to the holding device 21a, 21b in order to tighten the belt 3 around the pulleys 5a, 5b. However this is an optional feature. Unless a drum motor is used the block 6 could also comprise the bearings for the rotation of the pulley and possibly also connections for driving the pulley. The belt 3 can be driven by one or both of the pulleys or by another driving means connected to the belt 3.

Figure 6:
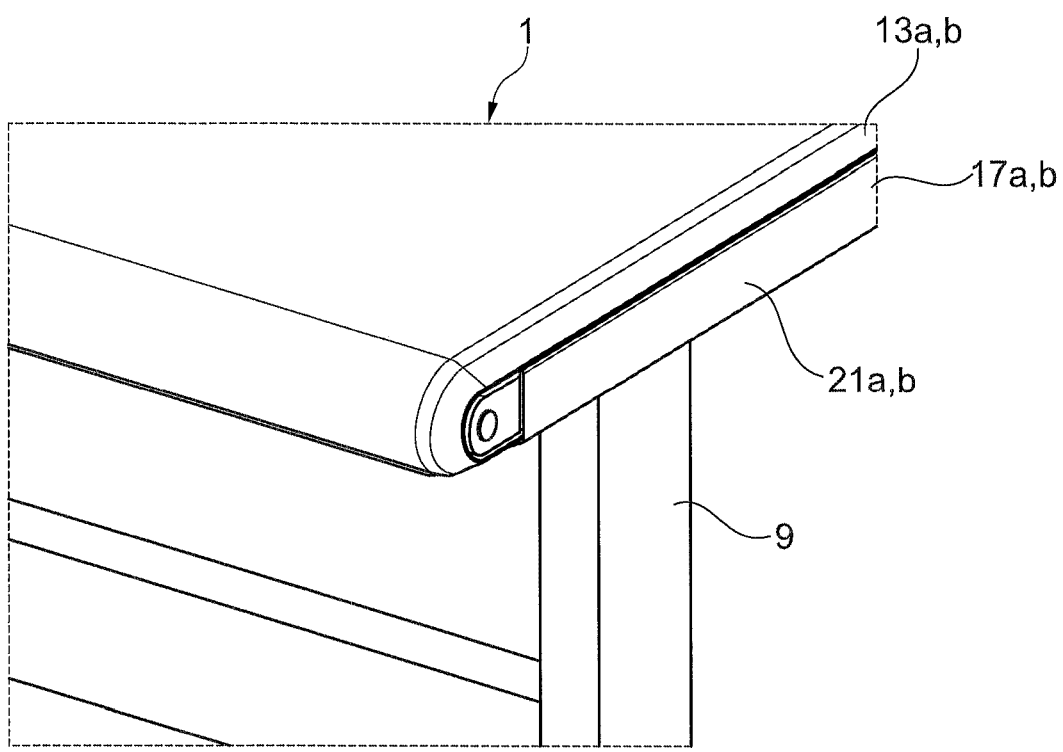
FIG. 6 shows schematically a perspective view of a corner of one of the belt conveyors as shown in FIGS. 3 and 4.

FIG. 6 shows schematically a perspective view of a corner of one of the belt conveyors 1 as shown in FIGS. 3 and 4. Here it can be seen how a part of the holding device 21a, 21b is provided along a long side 17a, 17b of the belt conveyor. The sloped edge area 13a, 13b of the belt 3 can also be seen.

Figure 7:
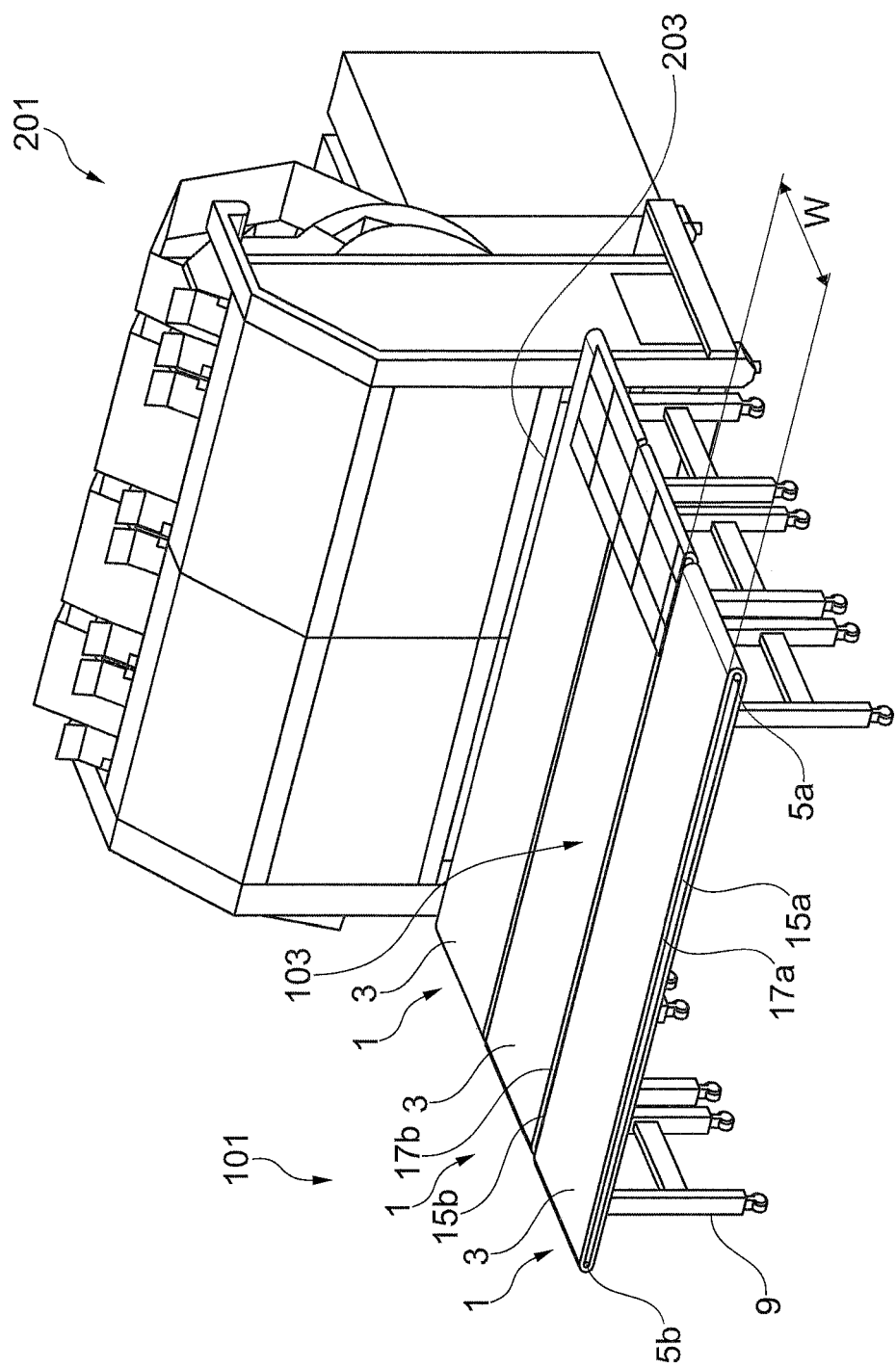
FIG. 7 shows schematically a box template production system comprising a belt conveyor system according to one embodiment of the invention.
Figure 8:
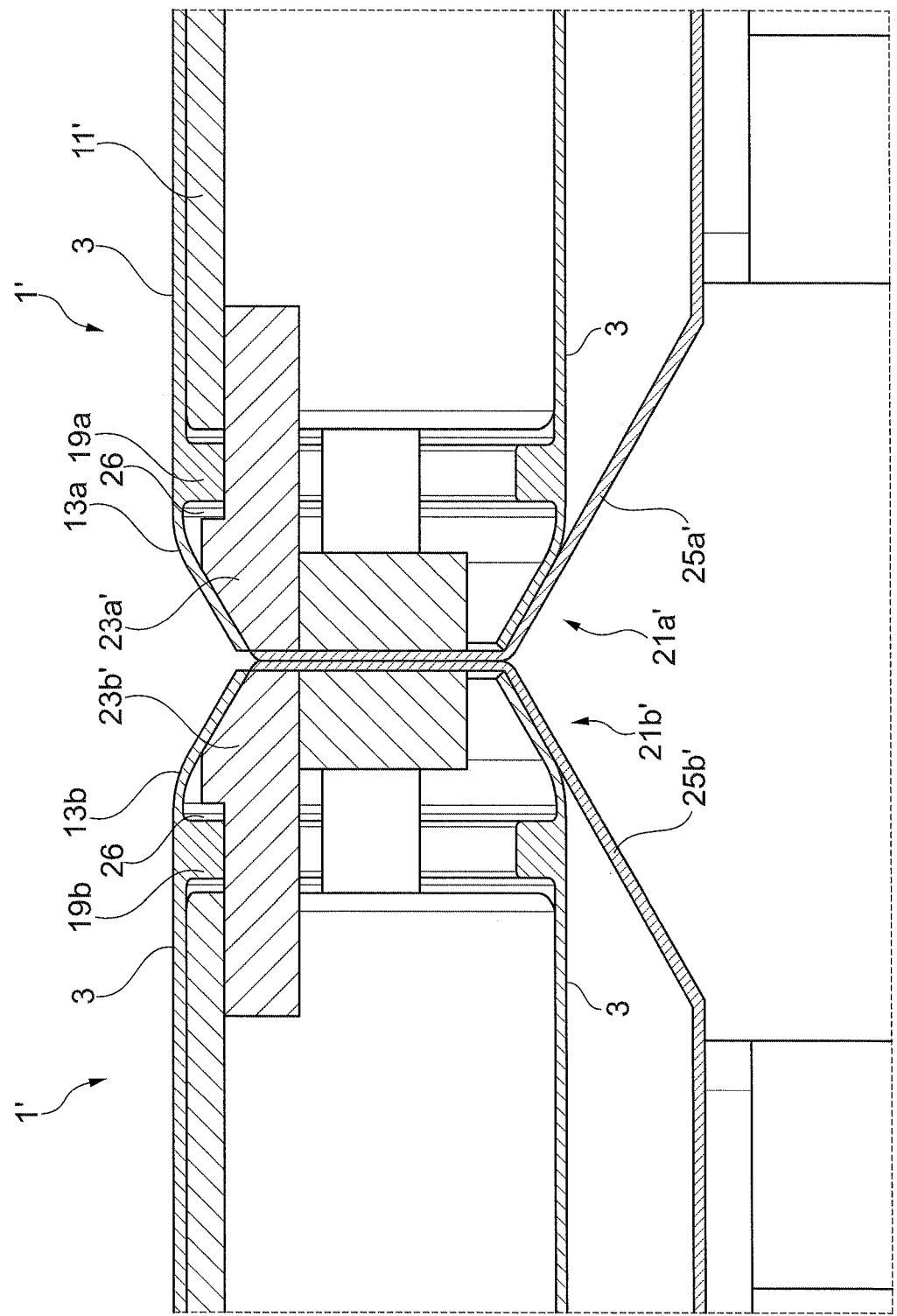
FIG. 8 shows schematically parts of a belt conveyor in cross section according to one embodiment of the invention.

FIG. 7 shows schematically a box template production system 201 comprising a belt conveyor system 101 according to one embodiment of the invention. The belt conveyor system 101 is the same as the one described in relation to FIGS. 3 and 4 and will not be further described here. A long side 17a, 17b of the belt conveyors 1 can be seen and a width W of a belt conveyor 1 is shown. Furthermore a combined upper surface 103 of the belt conveyor system 101 can be seen.

The belt conveyor system 101 is provided at an outlet 203 from the box template production system 201 for transport of the box templates on the belt conveyor system 101 in a direction transverse to a direction in which the box templates are delivered out from the box template production system 201. As described above, in these kind of box template production systems cuttings to the templates are often provided in several directions and in this shown system the belt conveyor system 101 is used as a support for the box templates while doing the cuttings. Furthermore often the templates need to be guided back and forth during the cutting, i.e. in a transverse direction with regard to the belt moving direction. Hereby parts of the box templates could be stuck in between the belt conveyors or at their edges. However with this design this risk has been decreased. The sloped edge areas of the belt conveyors will make it less likely that parts of the templates get stuck. Furthermore with this design of the belt conveyors they can be provided really close to each other hereby providing a combined upper surface 103, which is without any non-driven sections or sensitive interruptions.

FIG. 8 shows schematically parts of a belt conveyor 1' in cross section according to one embodiment of the invention. Many of the parts in this embodiment are the same as in the previously described embodiment in relation to FIGS. 3 and 4 and are also given corresponding numbers. In this embodiment a first part 23a', 23b' of the holding device 21a', 21b' has been differently designed. It can be an integrated part of the holding device 21a', 21b', a separate part connected to the holding device 21a', 21b' or in another embodiment of the invention it can instead be a part of the belt support device 11'. In all these examples the first part 23a', 23b' is however connected to the holding device 21a', 21b'. A guiding element 26, for example in the form of a recess, is in this embodiment provided for directional control of the belt positioning devices 19a, 19b.

In one embodiment of the invention the first part 23a', 23b' of a holding device 21a', 21b' comprises a guiding element 26 for housing a belt positioning device 19a, 19b of the belt 3. In another embodiment of the invention the belt supporting device 11' itself comprises at least one guiding element 26, for example in the form of a recess, for housing and directional control of at least one belt positioning device 19a, 19b of the belt 3. The belt supporting device 11' comprises at least one outer edge part 23a', 23b' comprising said guiding element 26. Said outer edge part 23a', 23b' provides a support for a corresponding outer edge 13a, 13b of the belt 3 at a different level than the support of the middle part 13 of the belt 3 from the belt supporting device 11'. Hereby at least one sloped edge of the belt is provided.

The invention claimed is:

1. A belt conveyor comprising;
   an endless loop of belt which is rotatable about at least two pulleys in the belt conveyor, whereby different parts of the belt will constitute an upper surface for transporting goods during a run;
   a frame holding said at least two pulleys;
   a belt supporting device configured for supporting the belt between the at least two pulleys while allowing the belt to slide over the belt supporting device, wherein said belt comprises a substantially planar middle part along the length of the belt and two edge areas, one provided on each side of the middle part, wherein at least one of said edge areas is sloped towards an opposite part of the belt in the endless loop at least when said at least one edge area constitutes a part of the upper surface of the belt; and
   at least one holding device provided partly along at least one long side of the belt conveyor, wherein said at least one holding device is connected to the frame and configured for holding the belt supporting device, wherein said holding device is configured for supporting said at least one edge area outside said belt supporting device at a different level than the belt supporting device, thereby providing at least one sloped edge of the belt.

2. A belt conveyor according to claim 1, wherein at least one of said edge areas of the belt forms a rounded edge of the belt along a long side of the belt conveyor, at least when the at least one edge area constitutes a part of the upper surface of the belt.

3. A belt conveyor according to claim 1, wherein said edge areas of the belt each comprises a belt positioning device extending inwards towards an opposite side of the belt in the endless loop and configured for being provided right outside the width of the belt supporting device or in a guiding element of the belt supporting device for keeping the belt in position.

4. A belt conveyor according to claim 1, wherein said at least one holding device comprises a first part connected to the belt supporting device and configured for supporting said at least one edge area outside said belt supporting device when it constitutes a part of the upper surface of the belt and a second part connected to the first part and connected to the frame, said second part being configured for supporting the at least one edge area when it is not part of the upper surface of the belt.

5. A belt conveyor according to claim 4, wherein said first part comprises a guiding element for directional control of a belt positioning device of the belt.

6. A belt conveyor according to claim 1, wherein the belt supporting device comprises at least one guiding element for directional control of at least one belt positioning device of the belt and wherein said belt supporting device comprises at least one outer edge part comprising said guiding element and providing a support for a corresponding outer edge of the belt at a different level than the rest of the belt supporting device hereby providing at least one sloped edge of the belt.

7. A belt conveyor according to claim 1, wherein no parts of the belt conveyor protrudes in a width direction of the conveyor belt outside a holding device provided partly along at least one long side of the belt conveyor, wherein said at least one holding device is connected to the frame and configured for holding the belt supporting device.

8. A box template production system comprising a belt conveyor system according to claim 7, wherein said belt conveyor system is provided at an outlet from a box template production machine for transport of box templates on the belt conveyor system in a direction transverse to a direction in which the box templates are delivered out from the box template production machine.

9. A belt conveyor system comprising at least two belt conveyors according to claim 1, wherein said at least two belt conveyors are positioned side by side with sloped edge areas of the belt towards each other together providing a combined upper surface of the belt conveyor system.

10. A belt conveyor comprising;
    an endless loop of belt which is rotatable about at least two pulleys in the belt conveyor, whereby different parts of the belt will constitute an upper surface for transporting goods during a run, the belt comprising a substantially planar middle part along the length of the belt and two edge areas, one provided on each side of the middle part, at least one of the edge areas being sloped towards an opposite part of the belt in the endless loop at least when the at least one edge area constitutes a part of the upper surface of the belt;
    a frame holding the at least two pulleys; and
    a belt supporting device configured for supporting the belt between the at least two pulleys while allowing the belt to slide over the belt supporting device, the belt supporting device comprising:
        at least one guiding element for directional control of at least one belt positioning device of the belt; and
        at least one outer edge part comprising the guiding element and providing a support for a corresponding outer edge of the belt at a different level than the rest of the belt supporting device, thereby providing at least one sloped edge of the belt.

11. A belt conveyor according to claim 10, wherein at least one of the edge areas of the belt forms a rounded edge of the belt along a long side of the belt conveyor, at least when the at least one edge area constitutes a part of the upper surface of the belt.

12. A belt conveyor according to claim 10, wherein said edge areas of the belt each comprises a belt positioning device extending inwards towards an opposite side of the belt in the endless loop and configured for being provided right outside the width of the belt supporting device or in a guiding element of the belt supporting device for keeping the belt in position.

13. A belt conveyor according to claim 10, further comprising at least one holding device provided partly along at least one long side of the belt conveyor, wherein the at least one holding device is connected to the frame and configured for holding the belt supporting device, wherein the holding device is configured for supporting the at least one edge area outside the belt supporting device at a different level than the belt supporting device, thereby providing at least one sloped edge of the belt.

14. A belt conveyor according to claim 13, wherein said at least one holding device comprises a first part connected to the belt supporting device and configured for supporting the at least one edge area outside said belt supporting device when it constitutes a part of the upper surface of the belt and a second part connected to the first part and connected to the frame, the second part being configured for supporting the at least one edge area when it is not part of the upper surface of the belt.

15. A belt conveyor according to claim 14, wherein said first part comprises the guiding element for directional control of a belt positioning device of the belt.

16. A box template production system, comprising:
a box production machine configured to form box blanks, the box production machined being configured to advance the box blanks out of an outlet of the box production machine in a first direction; and a belt conveyor system configured to be positioned adjacent to the outlet of the box production machine, the belt conveyor system comprising two or more belt conveyors, each of the two or more belt conveyors having an endless belt mounted on a pair of pulleys for rotation in a second direction transverse to the first direction, the endless belt of each belt conveyor having an upper surface comprising a substantially planar middle portion and at least one edge area angled at least partially towards an interior of the belt, the at least one edge area extending along a lateral side of the belt conveyor, wherein the at least one edge areas of the two or more belt conveyors cooperate to form a recess in a combined upper surface formed by the belts of the two or more belt conveyors when the two or more belt conveyors are positioned with their lateral sides adjacent to one another.

17. A box template production system according to claim 16, wherein each of the two or more belt conveyors further comprises a holding device configured to hold the at least one edge area in the angled orientation.

18. A box template production system according to claim 16, wherein each of the two or more belt conveyors further comprises a belt supporting device configured for supporting the belt between the pair of pulleys while allowing the belt to slide over the belt supporting device.

* * * * *